May 12, 1959  D. W. EPSTEIN ET AL  2,885,935
COLOR-KINESCOPES, ETC
Filed May 16, 1956  5 Sheets-Sheet 1
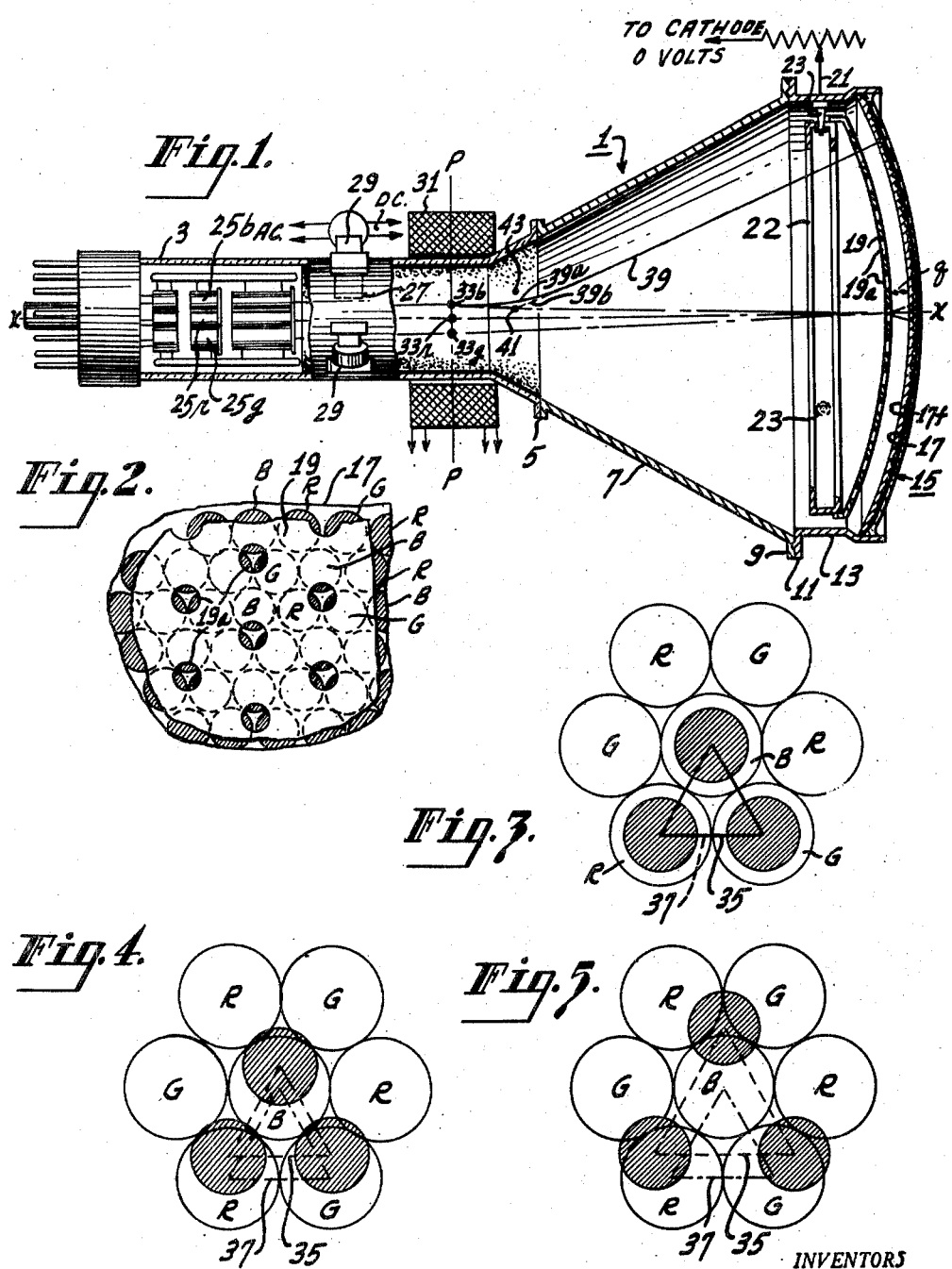
INVENTORS
DAVID W. EPSTEIN,
PETER E. KAUS &
DAVID D. VAN ORMER
BY Roderick Malcolm
ATTORNEY

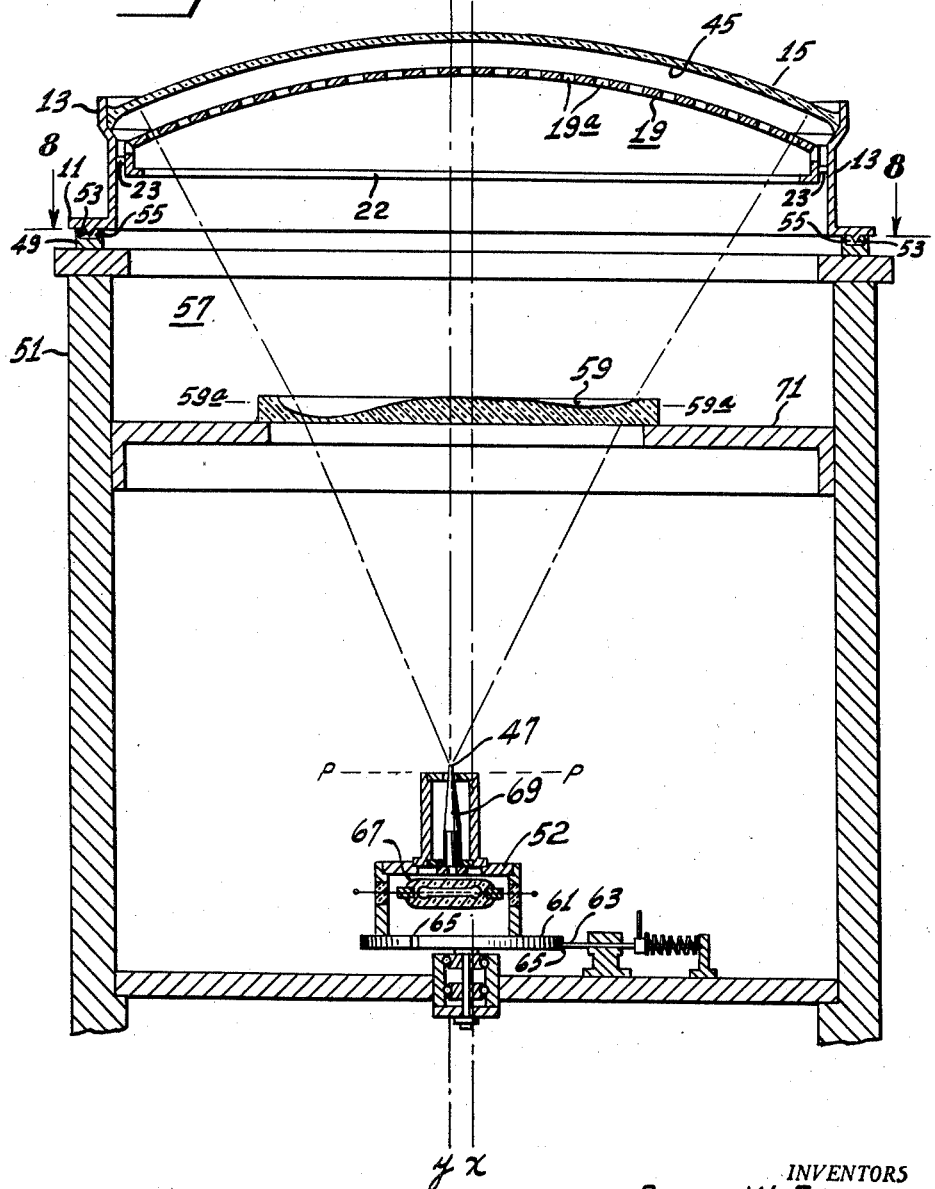

INVENTORS
DAVID W. EPSTEIN
PETER E. KAUS &
DAVID D. VAN ORMER
BY Roderick Malcolm
ATTORNEY

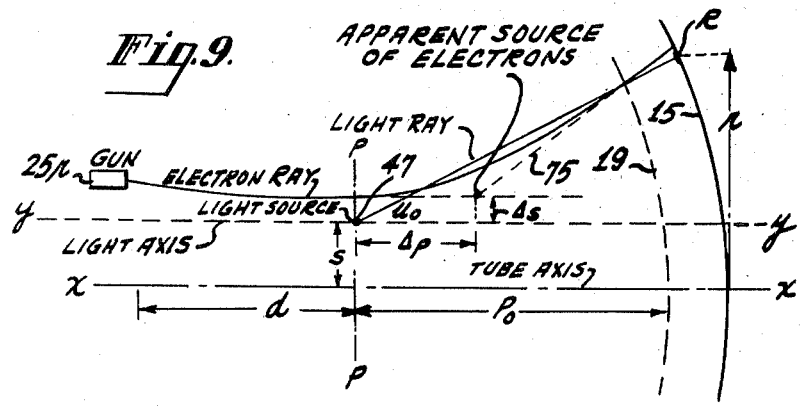
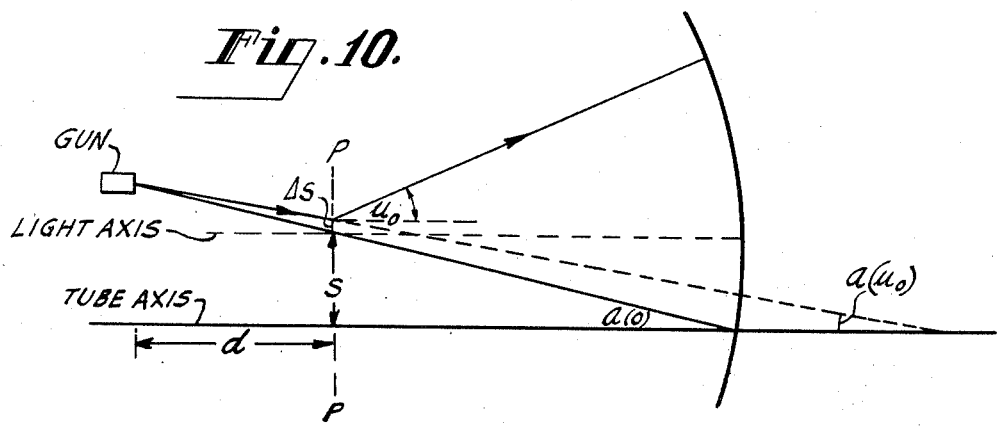
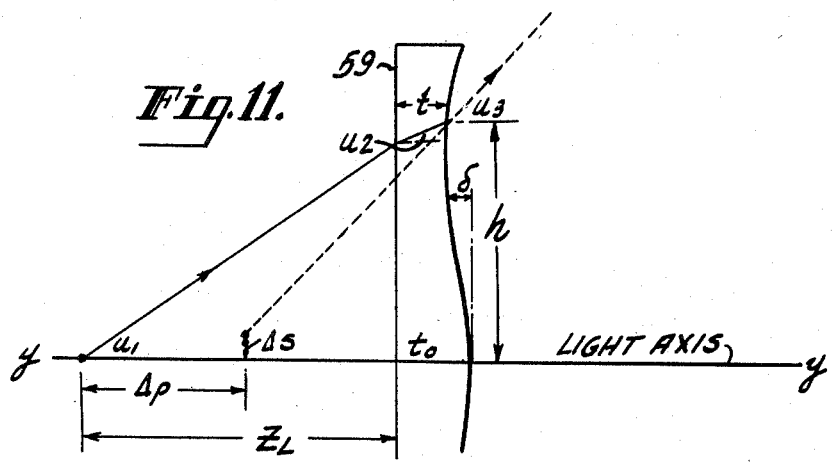

May 12, 1959

D. W. EPSTEIN ET AL 2,885,935

COLOR-KINESCOPES, ETC

Filed May 16, 1956

INVENTORS
DAVID W. EPSTEIN
PETER E. KAUS &
DAVID D. VAN ORMER

BY Roderick Malcolm

ATTORNEY

United States Patent Office 2,885,935
Patented May 12, 1959

2,885,935

COLOR-KINESCOPES, ETC.

David W. Epstein and Peter E. Kaus, Princeton, N.J., and David D. Van Ormer, Lancaster, Pa., assignors to Radio Corporation of America, a corporation of Delaware Application May 16, 1956, Serial No. 585,254

6 Claims. (Cl. 95—1)

This is a continuation-in-part, and is substituted for, application Serial No. 533,278, filed September 9, 1955, now abandoned.

This invention relates to improvements in 3-beam tri-color kinescopes of the kind wherein the three electron-beams, in their transit to a screen-unit of the "shadow-mask" variety, are subjected not only to (a) horizontal and vertical scanning forces but also to (b) dynamic convergence forces, i.e. to electromagnetic or electrostatic forces which operate to keep the three beams converged adjacent to the surface of the shadow-mask throughout their scanning movement.

The principal object of the invention is to provide an improved color-tube of the subject (shadow-mask) variety, wherein picture defects occasioned by lack of register (of the electron beam-spots with the phosphor screen-dots) are minimized during normal operation of the tube (i.e. when the three beams are subjected to dynamic convergence).

Another and important object is to achieve the above-mentioned principal object without any reduction and, indeed, permitting a positive increase, in the light output of the kinescope, and this too without complicating its physical structure.

Another and related object of the invention is to provide a novel method of and means for manufacturing a color-kinescope embodying the above mentioned advantages.

Stated generally, the foregoing and related objects are achieved, in accordance with the invention, by the provision of a color-kinescope of the shadow-mask variety wherein the phosphor screen-dots are relatively so arranged with respect to the dot-like mask apertures that, when the three electron-beams are subjected to dynamic convergence, the spacing between the centers of the three beam-spots (i.e. the "electron triangle") and the spacing between the centers of the corresponding (red, blue and green) phosphor dots (i.e. the "phosphor triangle") is substantially uniform, and said "spots" and "dots" are in register over the entire scanned-area of the screen. This desired characteristic is achieved in accordance with the invention by (a) the use, during the screen-plotting operation, of a unique (aspheric asymmetric) optical system and (b) by a unique mask-to-screen spacing or "q" calculated to make the phosphor dots tangent to each other.

The invention is described in greater detail in connection with the accompanying five sheets of drawings, wherein:

Fig. 1 is a partly diagrammatic longitudinal sectional view of a 3-gun tri-color kinescope of the shadow-mask dot-screen variety; the drawing being marked with lines indicative of the axial and off-axis shift in the color-centers of the three dynamically converged electron-beams as they approach their maximum angle of deflection;

Fig. 2 is an enlarged fragmentary rear-elevational view of the screen-unit of the color-kinescope of Fig. 1;

Fig. 3 is a greatly enlarged elevational view of the central portion of the color-screen showing the undeflected beam-spots (the centers of which form the "electron-triangle") in register with the color-phosphor dots (the centers of which form a "phosphor triangle");

Fig. 4 is a greatly enlarged elevational view of a group of phosphor dots near the edge of the screen; the drawing being marked with triangles to illustrate the "radial" type of misregister occasioned by the forward movement of the plane-of-deflection as the electron-beams approach the limit of their scanning movement;

Fig. 5 is a view similar to Fig. 4 but showing how the radially displaced electron-beams of Fig. 4 are "de-grouped" by the off-axis movements of their color-centers when said beams are subjected to dynamic convergence, as they are in a color-tube wherein the mask-to-screen spacing is adjusted for constant magnification, without dynamic convergence;

Figure 7:
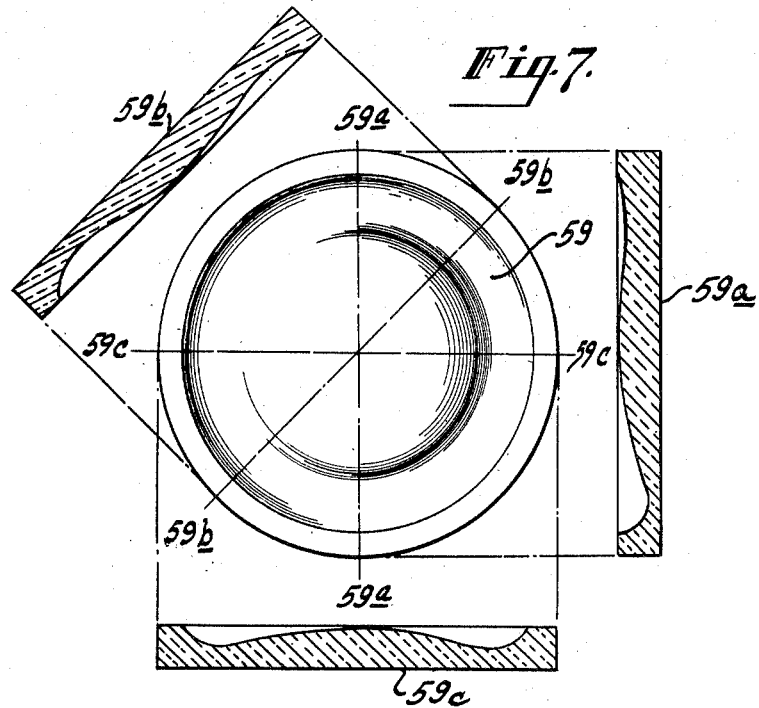
Figure 8:
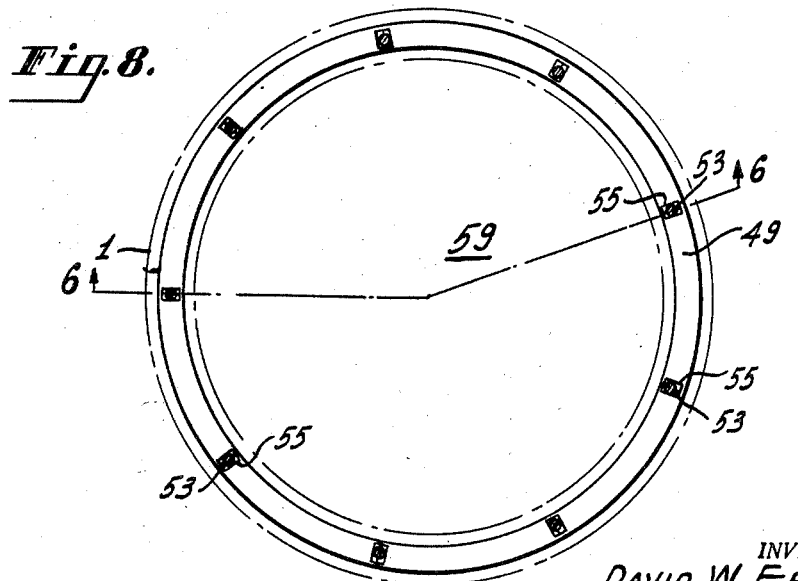
Figure 12:
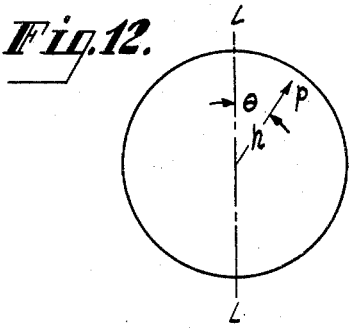
Figure 13:
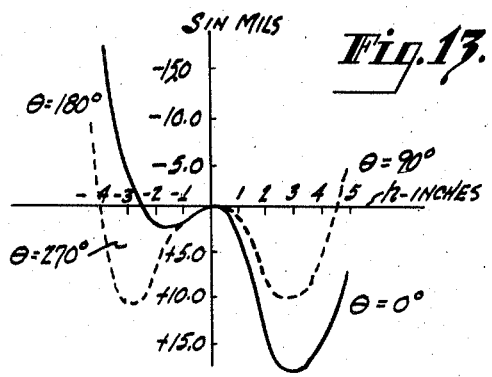
Figure 14:
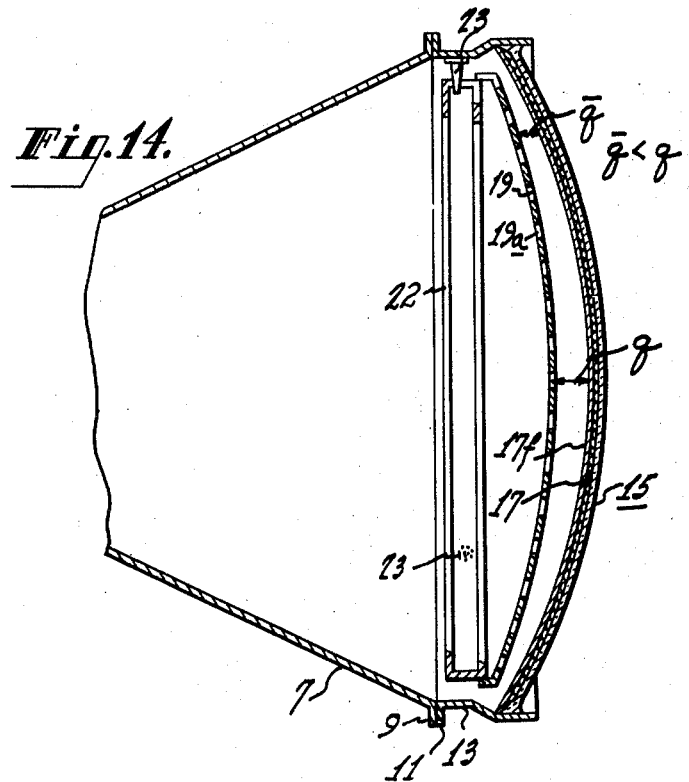

Fig. 6 is an elevational view, partly in section, of a photographic lighthouse having an optical system, including a correcting lens constructed in accordance with the principle of the present invention, and showing the mask and screen-plate of a color-kinescope set-up thereon in a position to record, upon the screen-plate, the pattern with which light rays from the lens are endowed in passing through the systematic pattern of apertures in the mask;

Fig 7 is a plan view of the second or top face of the lens with the profile of said face projected along (a) the single line of symmetry of the lens, (b) along a line 45° removed from said line of symmetry and (c) along a line 90° removed from said line of symmetry;

Fig. 8 is a plan view of the top surface of the pedestal of the lighthouse of Fig. 6 showing a series of dwells for aligning the tube-cap with the single line of symmetry of the lens of Figs. 6 and 7;

Fig. 9 is a schematic diagram showing the path of electrons when deflected at a large angle and subjected to dynamic convergence in the color-tube of Fig. 1, compared to the path of light rays in a lighthouse of the prior art (i.e. one without a correcting lens). This drawing, which will be referred to in explaining the principle of the present invention, is not drawn to scale;

Fig. 10 is a chart or diagram correlating the outward movement ($\Delta S$) of the color-center of one electron-beam with the convergence angle ($\alpha$) of that beam when it is subjected to "dynamic convergence";

Fig. 11 is a sectional view of the lens of Fig. 7 marked with lines indicating (a) the angle of incidence of a light ray upon the first face of the lens, (b) its angle within the lens, and (c) its exit angle;

Fig. 12 is a diagram (which will be referred to in the description of Fig. 13) relating any point ($p$) on the surface of the lens to the azimuthal angle ($\theta$) and height or radius ($h$);

Fig. 13 is a chart or plot of the profile of the lens; the ordinate showing the depth ($\delta$) of the lens in mils of an inch and the abscissae showing the height or radius ($h$) in inches. The various curves being for different angles ($\theta$) of the azimuth, and Fig. 14 is a sectional view of the front end of a color-kinescope similar to the one shown in Fig. 1 but with the mask-to-screen spacing altered in a manner taught by the present invention.

The 3-gun tri-color "shadow-mask dot-screen" kinescope shown in Fig. 1 comprises an evacuated envelope 1 having a glass neck portion 3 connected by a suitable glass-to-metal seal 5 to the small end of a metal cone 7 which, in turn, is connected by complementary sealing flanges 9 and 11 to a cylindrical metal front-end portion or "cap" 13. The cap 13 terminates in a spherically curved face-plate 15, the concave inner surface of which comprises the mosaic screen 17 of a bi-part screen-unit 17, 19 of the shadow-mask variety.

The mosaic screen 17 (see Fig. 2) comprises a multiplicity (usually 300,000 or more) of "triads" (i.e. groups-of-three) of red (R), blue (B) and green (G) color-phosphor dots. The phosphor-dots are tangent to each other and are here arranged in a "hexagonal" pattern; that is to say each dot is surrounded by six other dots, alternate ones of said other dots being of a second color-response characteristic and the intermediate ones of said other dots exhibiting a third color-response characteristic. An electron-transparent, light-reflecting, metallic (e.g. aluminum) film 17f (Fig. 1) covers the entire target surface of this dot-like mosaic-screen, and forms an electrical connection to the cap 13 of the envelope 1.

The other element or "shadow mask" of the bi-part screen-unit 17, 19 comprises an approximately spherically curved thin-metal plate 19 having its convex surface presented across an intervening space "q" to the concave target surface of the screen 17. The mask contains a multiplicity of apertures 19a arranged in the same (hexagonal) pattern as the phosphor screen-dots; there being one mask aperture for each triad (RBG) of dots. As indicated by the single electrical connection 21 (Fig. 1) the metallized screen 17 and the mask 19 are operated at the same potential (e.g. 20 kv.) to provide a "field-free" space therebetween, as is usual in color-kinescopes operating on the "shadow-mask" principle. The mask has an integral rim 22 and is supported about said rim on three or more pegs 23 which project radially inward from the inner surface of the cap portion 13 of the envelope. The connection between the pegs 23 and the rim 22 is such as to permit the mask to be removed from the cap during the three (later described) emulsion-coating and developing operations incident to laying down the three color-phosphors (RBG) on the glass screen-plate 15.

The tubular glass neck 3 of the envelope 1 contains a battery of three electron-guns 25r, 25b and 25g each of which is allotted to a particular screen-color. The guns are here shown arranged delta fashion about the long axis x—x of the envelope (as in Schroeder U.S.P. 2,595,548) so that their beams converge adjacent to the surface of the mask 19 where their paths cross and proceed to the different color-phosphor dots. Alternatively, the guns may be arranged "in-line," or a single beam may be employed, in which latter case auxiliary means may be provided as, for example, in Jenny U.S.P. 2,611,099, for sequentially shifting the single beam to positions corresponding to that of the several beams in a multi-gun tube.

As is now more or less standard practice the red, blue and green beams are subjected to dynamic convergence forces for maintaining them converged at or near the surface of the mask throughout their scanning movement. In the instant case the dynamic convergence forces are applied to the separate beams by three internal pole pieces 27 actuated by small electro-magnets 29 in the manner described in greater detail in the copending application, Serial No. 364,041 (now U.S.P. 2,752,520), of Albert M. Morrell, for example. The copending application, Serial No. 164,444 (now U.S.P. 2,751,519) of Albert M. Friend may be referred to for other electromagnetic (and electrostatic) types of dynamic beam-convergence means.

Referring still to Fig. 1. Here, as in Schroeder U.S.P. 2,595,548, the required horizontal and vertical scanning movements are applied to all three of the electron-beams from the guns 25 by a common deflecting yoke 31 which will be understood to comprise two electromagnetic coils (indicated by the double current-leads) disposed at right angles to each other on the glass neck 3. As indicated by the single vertical line P—P, when the three beams are only slightly deflected (i.e. when they are directed to the central part of the screen-unit) the "normal" plane-of-deflection usually crosses the central axis (x—x) of the tube at or near the center of the yoke 31 and the color centers of the beams lie at the apices of a triangle in said plane, as indicated by the three points 33r, 33b, 33g in Fig. 1. Similarly, as shown in Fig. 3 (wherein the shaded areas designate the three beams) the centers of the three beams form an "electron triangle" 35 on the screen which, desirably, coincides or "registers" with a "phosphor triangle" 37 (i.e. a triangle formed by the center points of three phosphor dots R, B and G) near the central axis of the tube.

The fact that the plane-of-deflection, and hence the color centers of the beams, are not fixed but gradually shift their positions as the beams depart from the center of the screen unit, is illustrated in Fig. 1 wherein one of the electron-beams is shown by a solid line 39 at one limit of its scanning movement. Here, it will be observed, the path of the beam curves outwardly, as indicated at 39a, as it leaves the yoke 31 and, thereafter, moves in a straight line to the screen unit. If this straight portion of the beam-path 39 is projected rearwardly, as indicated by the broken line-segment 39b, it will intersect the axis of origin of said beam at a new color center 41 which lies in front of its original color-center 33b. Assuming now that the location of the color-phosphor dots was plotted in a conventional light-box or "lighthouse" (i.e. one without a correcting lens), then the above described forward and rearward movements of the color centers (and of the plane-of-deflection) will cause the electron-triangle 35 to move radially out of register with the phosphor triangle 37 (as shown in Fig. 4) and give rise to color-dilution wherever a beam strikes more than one color-phosphor.

As brought out by the same inventors in copending application Serial No. 485,542 now U.S.P. 2,817,276, the above described "radial" type of misregister can be avoided by the use of an axially symmetric aspheric optical system in the lighthouse employed in the screen-plotting operation. Such a lens-system however does not correct for "degrouping" caused by the dynamic convergence forces which keep the beams converged throughout all deflection angles. Here, as the deflection angle increases, the plane-of-deflection moves forward and, in addition, the color-center of each beam (i.e. the point at which it intersects the instantaneous plane-of-deflection) moves radially outward, as indicated by the point 43 in Fig. 1. As a consequence, in the color-kinescopes of the prior art, the electron-triangle 35 not only moves radially with respect to the phosphor triangle (as described in connection with Fig. 4) but also becomes enlarged with respect to the phosphor triangle, so that, in the absence of compensation, the beams whose centers form the triangle may embrace as many as seven screen-dots, as shown in Fig. 5.

As previously mentioned, the present invention contemplates and its practice provides a correcting lens of unique construction that operates to move the apparent or virtual source of light at a function of deflection angle in the same axial and off-axis directions that each color-center in the finished tube moves as a function of deflection angle when the three beams are subjected to dynamic convergence during their scanning movements. However, before proceeding to a detailed description of this unique lens it may be well to refer to Fig. 6 for an understanding of a method of and means for utilizing the lens in the screen-plotting operation.

In Fig. 6, as in Fig. 1, 13 designates the cylindrical metal side wall of the front end or "cap" of a color-kinescope of the 3-gum shadow-mask variety (see Fig. 1) at that stage of its manufacture whereat the inner or "target" surface of its face-plate or screen 15 has been provided with a coating 45 comprising a photographic emulsion for recording the mosaic pattern impressed thereon by reason of the presence of the tube's shadow-mask 19 in the path of light rays emanating from small area or a "point" 47 (later described) corresponding to the small area or point traversed by one of the three electron-beams in the tube's normal plane-of-deflection P—P. Assuming that the point 47 in the plane-of-deflection P—P is the one traversed by the "red" beam in such a kinescope, then the emulsion coating 45 on the inner surface of the glass plate 15 may contain a red-phosphor such, for example as manganese activated zinc phosphate.

As previously mentioned the apertured shadow-mask 19 is removably supported on the inner surface of the cap by three or more pins 23 to permit the mask to be removed from the assembly during the three emulsion-coating and developing operations incident to laying down the three (red, blue and green) color-phosphors. It is of course necessary that the screen-unit (i.e. the screen-plate 15 and its apertured mask 19) be aligned very accurately with respect to the point 47 and, to this end, the metal cap 13 within which said unit is supported, and the top 49 of the table or pedestal 51 upon which the cap is mounted, are provided with a suitable indexing mechanism. The indexing mechanism here shown comprises three protuberances 53 formed in the sealing flange 11 about the lower edge of the cylinder or cap 13 within which the screen-unit is mounted, and a number (in this case nine, see Fig. 8) of radially extending V-grooves 55 disposed in circumferentially spaced relationship about the central opening 52 in the table 51. The protuberances 53 have rounded terminals which engage the slanting sides of the V-grooves 55 and hence provide a self-leveling, self-centering support which holds the screen-unit accurately centered, in any of three positions (later described) on the central vertical axis $x$—$x$ of the system.

The optical system of the lighthouse of Fig. 6 comprises a source of light (later described) contained within a box 57 adjacent to the base of the lighthouse and a correcting lens 59 interposed between the light-source and the shadow-mask. As will hereinafter more fully appear the lens and the other elements of the optical system are designed, positioned and arranged to cause the light rays to impinge upon the same elemental areas of the screen plate 15 as will the three electron-beams when subjected to dynamic convergence during operation of the complete tube.

As above mentioned the source of light for the optical system of the lighthouse is contained within a box 57. This box is mounted on a turntable or turret 61 for rotation about the central axis $x$—$x$ of the lighthouse. The turntable 61 serves to bring the point 47 of the system to the position of any one of the three-beams in the normal plane-of-deflection of the 3-gun color-kinescope in which the screen-unit 17, 19 is to be used. A suitable indexing mechanism, which may comprise a spring loaded plunger 63 which seats in appropriately spaced dwells 65 in the rim of the turntable 61, ensures the accurate location of the point 47 of the optical system.

The primary source of light within the box 57 may comprise an ultra-violet lamp 67, such as a General Electric Co., one kilowatt high pressure mercury arc lamp, type BH6. Ultraviolet rays of wave-length of from say, 3200 to 4500 Angstroms, are preferred because their use permits the described screen-plotting operation to be carried out practically in day-light. This small mercury-vapor lamp 67 has a light-emitting central portion about one inch long which is disposed with its center on the "light axis" $y$—$y$ of the system. This light axis $y$—$y$ corresponds to the axis of origin of one of the electron-beams and is parallel to the central axis $x$—$x$ of the lighthouse when the turntable 61 is in any one of its three previously described positions.

Light rays from the lamp 67 are conducted along the light axis $y$—$y$ to the point 47 which in the instant case, lies in or closely adjacent to the normal plane-of-deflection P—P through a tapered light conduit 69 constituted essentially of a material having a high index of refraction and of high transparency to rays of the particular wavelengths employed. Having regard also to the heat generated as an incident to the operation of the lamp 67, the conduit 69 is preferably constituted of quartz or of heat resisting glass, such as "Pyrex." Optically clear fused quartz is to be preferred to "Pyrex" since when the latter material is used a somewhat longer exposure time is required to produce a mosaic screen-pattern of the desired high quality.

As will hereinafter more fully appear in connection with Figs. 6, 7 and 9–13, the correcting lens 59 has no axis of symmetry and may be described as an "aspheric asymmetric" lens. However, it does have a single line of symmetry $59a$—$59a$ (see Figs. 6 and 7) and it is important that the lens be so oriented in the lighthouse, during each photographic exposure of the screen-coating, that said line of symmetry intersects, at right angles, both the light axis $y$—$y$ (Fig. 6) of the lighthouse and the central axis $x$—$x$ (Figs. 6 and 1) of the tube. Thus, between exposures, the cap 13, of which the screen-plate 15 is a part, must be rotated 120° relative to the previous setting of the line-of-symmetry $59a$—$59a$ of the lens 59. This can be accomplished either (a) by leaving the lens and the light-source in the same position for all three exposures and re-locating or "rotating" the cap 120° on its indexed support 55 or (b) by leaving the cap in its original (indexed) position and rotating the light-source 67, 69 and the lens 59 as a unit. In the latter case the lens 59 may be supported by arms (not shown) carried by the turntable 61 instead of upon the fixed lens-supporting bracket 71 shown in Fig. 6.

The function and design of the optical correcting lens 59 in the "lighthouse" of Fig. 6 will the more readily be understood upon reference to Figs. 9–13, and to the several formulae, in the following description:

In Fig. 9, as in Figs. 1 and 6, P—P designates a reference plane corresponding to the tube's "normal" plane-of-deflection, and 47 is a fixed point from which light rays are projected towards the apertured-mask 19 and screen-plate 15. It will be observed that the plane P—P from which the light rays are projected intersects the central axis $x$—$x$ of the tube at a distance $P_0$ from the mask 19. In the absence of the lens 59 in the apparatus of Fig. 6 a light ray making a deflection angle $u_0$ with the light axis $y$—$y$ will cause a phosphor dot R to be placed on the screen plate 15 at a radius $r$. However, an electron ray from the "red" gun $25r$ when subjected to deflection forces from a conventional yoke (31, Fig. 1) and to dynamic convergence forces supplied, for example, by the small electromagnets (29 of Fig. 1) would not traverse the same path as the light ray from the point 47 and hence would fail to strike the center of the dot R. This is so because there are basic differences between the electron path and the optical path. The principal difference is manifest from the fact that the final direction of the electron path when extended rearwardly (as indicated by the broken straight line 75) intersects the initial direction of the electron ray at a distance $P_0$—$\Delta P$ from the shadow mask measured along a direction parallel to the light axis $y$—$y$, where $\Delta P$ is a function of the deflection angle $u_0$ and at a distance $\Delta S$ perpendicular to said axis $y$—$y$. A calculation based upon an assumed constant or uniform deflection field of length L, leads to the following expression:

$$\Delta P = (L/2) \tan^2 (u_0/2) \qquad (1)$$

The $\Delta S$ mentioned in the preceding paragraph arises from another difference between the electron path and the light path, namely the fact that, as shown in Fig. 10, the convergence angle $\alpha$ changes as a function of the deflection angle $u_0$. This change in $\alpha$ makes the electron beam intersect the deflection plane P—P at a distance off the axis, not given by S (where the light source is located) but by $S + \Delta S$, where $\Delta S$ is given by the formula:

$$\Delta S = d[\tan \alpha(0) - \tan \alpha(u_0)] \qquad (2)$$

wherein: $\alpha(0)$ (as shown in Fig. 10) is the convergence angle for zero deflection; $\alpha(u_0)$ is the convergence angle for the deflection angle $u_0$ and $d$ is the distance from the effective plane of application of dynamic convergence to the plane-of-deflection P—P. In Fig. 10 the plane of application of dynamic convergence is, for illustration, shown as the plane of the end of the guns.

The effect of the above described off-axis movements ($\Delta S$) of the color-centers of the electron beams is (as shown more clearly in Fig. 5) to enlarge the electron-triangle 35 with respect to the phosphor-triangle 37 by an amount proportional to $\Delta S$. The lens of the invention makes the apparent light sources and the apparent electron sources virtually coincide at all deflection angles ($u_0$) so that radial and degrouping types of misregister are greatly reduced. Both the "radial" and "degrouping" types of misregister can be corrected to a good approximation by using a lens having a profile described by the general relation:

$$\delta = f_1(h) + f_2(h) \cos \theta \qquad (3)$$

wherein $f_1(h)$ and $f_2(h)$ are arbitrary analytic functions of $h$, which may be represented by polynomials.

In the following detailed description of the lens, reference is made to Figs. 11, 12 and 13. The additional symbols marked on Fig. 11 are:

$h$ = a height on the lens
$t$ = thickness of the lens at the height $h$
$Z_L$ = the distance from the light source to the first face of the lens and $u_1$, $u_2$ and $u_3$ are the inclination of a light ray with the light axis (y—y) before entering the lens, in the lens, and after leaving the lens, respectively, said light ray reaching the same point on the mask as would a light ray originating from the source with the inclination $u_0$ (Fig. 9) in the absence of the lens (59).

In the following Formula 4 for the design of the lens the same symbols are employed as are used in Figs. 9, 10 and 11:

$$\left(\frac{dt}{dh}\right)_0 = \frac{\sin u_3 - \sin u_1}{N \cos u_2 - \cos u_3} \qquad (4)$$

where:

$\left(\frac{dt}{dh}\right)_0$ = the slope of the lens along its line of symmetry, $$\tan u_3 = \frac{h - \Delta S}{Z_L + t - \Delta P}$$

$\sin u_1 = N \sin u_2$
$h = Z_L \tan u_1 + t \tan u_2 = (Z_L + t - \Delta P) \tan u_3 + \Delta S$
$N$ = index of refraction of the lens at the wavelength of light used in making the exposure.

In applying this Formula 4 to a particular installation, the slopes $(dt/dh)_0$ are determined at several $h$ values. The polynomial $$\left(\frac{dt}{dh}\right)_0$$

is passed through the $(dt/dh)_0$ values giving:

$$\left(\frac{dt}{dh}\right)_0 = 2\alpha_2 h - 3\alpha_3 h^2 - 4\alpha_4 h^3 - 5\alpha_5 h^4 - 6\alpha_6 h^5 - 7\alpha_7 h^6 \qquad (5)$$

at any $h$. This polynomial is then integrated yielding the thickness $t$ as a function of $h$ along the line of symmetry (59a—59a) where $\theta=0$. The number of terms used in the polynomial will depend upon the final accuracy desired.

Before proceeding to the actual lens-grinding instructions, attention is called to the fact that the forward movement of the plane-of-deflection, i.e. $\Delta P$ in Formula 4 need not be exactly as indicated by Formula 1 but may be determined empirically by measuring the amount of misregister upon an evacuated model of the tube. This procedure is recommended because ($a$) the face plate of a CR tube ordinarily becomes slightly deformed when the tube is evacuated and ($b$) the fields of the scanning yoke are seldom homogeneous.

As is conventional in the lens-grinding art the actual grinding instructions are given below in terms of $\delta$ (the depth of glass removed) where the relation between $\delta$, thickness $t$ and the central thickness $t_0$ is:

$$\delta = t_0 - t \qquad (6)$$

Here the depth $\delta_0$ along the line of symmetry is:

$$\delta_0 = \alpha_2 h^2 + \alpha_3 h^3 + \alpha_4 h^4 + \alpha_5 h^5 + \alpha_6 h^6 + \alpha_7 h^7 + \ldots \qquad (7)$$

where the coefficients $\alpha_2$, $\alpha_3$ etc. are the results of the polynominal fit to the $(dt/dh)_0$ values.

The depth for any azimuthal angle $\theta$ measured from the line of symmetry ($\theta=0$) is then given by:

$$\delta = (\alpha_2 h^2 + \alpha_4 h^4 + \alpha_6 h^6 + \ldots) + (\alpha_3 h^3 + \alpha_5 h^5 + \alpha_7 h^7 + \ldots) \cos \theta \qquad (8)$$

where coefficients $\alpha_2$, $\alpha_3 \ldots \alpha_7 \ldots$ are the same as those used in Equation 5.

Fig. 13 when read in connection with the reference symbols indicated in Fig. 12 shows typical cross-sections for a glass lens having an index of refraction (N) of 1.54708 in the ultra-violet region (e.g. 3800A.) and designed for use in the plotting of the mosaic dot pattern of a 21″ color-phosphor screen for use in a "shadow-mask" kinescope similar to the one shown in Fig. 1. Here the depth ($\delta$) of the lens, is marked on the vertical axis of the drawing in mils of an inch, and the height ($h$) (see Fig. 12) of the lens measured from the center of the lens, on the horizontal axis of the drawing, is marked in inches. The four curves labeled, respectively, $\theta=0°$; $\theta=90°$; $\theta=180°$ and $\theta=270°$ are the cross-sections of the lens at the indicated azimuthal angles when $\theta$ is measured from the line-of-symmetry L—L shown in Fig. 12.

As previously pointed out (in connection with Fig. 5) one effect of dynamic convergence upon the electron beams in a CR tube of the "masked target" variety (such for example as the "shadow-mask" tube shown in Fig. 1) made without using a lens, is to "degroup" the beams or, stated another way, to enlarge the "electron triangle" with respect to the "phosphor triangle" as the beams approach the boundaries of the screen. The optical correcting lens of the invention has the same ("degrouping") effect upon the separate beams of light used in the lighthouse (Fig. 6) during the screen-plotting operation as the yoke and dynamic convergence has on the electron beams. In order to produce phosphor dots which are tangent and in positions which are registered relative to the electron-beams, when the lens is used, it is necessary to make the mask-to-screen spacing (or "$q$") different from that which is used when a lens is not employed.

The following procedure has been successfully employed in determining the precise change in "$q$" required in applying the invention to a conventional 21″ color-kinescope (RCA type No. 21AXP22, made without the use of a lens) and can be employed with equal success in applying the invention to "shadow-mask" tubes of other shapes (e.g. "rectangular"), dimensions (e.g. 27″) and screen-types (e.g. "line-screen").

In the above identified conventional color-kinescope the "$q$" had been fixed in agreement with the formula prescribed by Van Ormer in copending application Serial No. 451,343, now U.S.P. No. 2,745,978 and was greater at the edge of the screen-unit than it was at the center. Here it was found that the degrouping error "$e$" (i.e., the displacement, due to dynamic convergence, of the center of each beam-spot with respect to its phosphor dot in a direction radially outward from the center of a given trio) was as follows, at various points on the screen:

($a$) at the center of the screen, $e=0.000$
($b$) about 6 inches from the center, $e=0.001$
($c$) about 9 inches from the center, $e=0.002$.

Applying these values to the formula:

$$\bar{q} = q\left[1 - \frac{e}{f}\right]$$

wherein:

$\bar{q}$ is the mask-to-screen spacing at any radial distance from the center of said screen;

$q$ is the mask-to-screen spacing at said radial distance from the center of the screen in the tube in which the above degrouping errors ($e$) were found;

$e$ is the amount of said degrouping error as measured from the nearest apex of a triangle drawn by connecting the centers of the triangularly arranged phosphor dots which lie at said radial distance from the center of said reference tube; and $f$ is the distance (approx. .010" in above mentioned tube) from the center of any phosphor triangle to any of its apices.

Substituting these values and the $q$ values given in the table below in the foregoing formula and solving for $\Delta q$ (i.e. the change in mask-to-screen spacing at the several points, $(a)$, $(b)$, $(c)$, etc., as given by $$\Delta q = (\bar{q} - q) = -q\left(\frac{e}{f}\right)$$

(a) $\Delta q = -0.000''$
(b) $\Delta q = -0.056$
(c) $\Delta q = -0.118$

To determine the mask-to-screen spacing or "$q$" required in the improved kinescope it is now necessary to subtract the above $\Delta q$ values from the original "$q$." Thus, the "new $q$" ($\bar{q}$ in the following table) measured along a line parallel to the central axis of the tube, is as given in the following comparative table:

| $q$ (prior art) | $\bar{q}$ (present invention), inches |
|---|---|
| At the center of the screen .533" | .533 |
| 6" from the center .557" | .501 |
| 9" from the center .590" | .472 |

Here it will be observed that in the case of a 21" color-kinescope (RCA model No. 21AXP22) embodying the invention the mask-to-screen spacing instead of increasing in the direction of the edge of the screen-unit (as in the prior art) actually decreases, monotonically. This is illustrated in Fig. 14 wherein the mask-to-screen spacing ($\bar{q}$) is indicated (by the symbols $\bar{q} < q$) to be smaller at the edges of the screen-unit than it is near the center of said unit.

It need scarcely be pointed out that since the purpose of making the above described changes in the mask-to-screen spacing is to ensure tangency of the phosphor screen-dots, the new spacing must be established before the screen-unit is placed in the "lighthouse."

When the screen-plotting operation is completed the cap 13 is sealed to the open end of the cone 7 (Fig. 1) in the usual way, that is to say with the mosaic patterns of the mask-apertures and phosphor dots centered on the central axis ($x$—$x$) of the tube.

In color-kinescopes constructed in accordance with the present invention the phosphor dots are tangent over the entire scanned area of the screen and the beam-spots and the phosphor dots remain in acceptable register throughout the beams' scanning movements. As a consequence the "tolerance" (i.e. the allowable variation in the relative size of the beam-spots and phosphor dots) is increased, as compared to that necessarily employed in color-kinescopes constructed in accordance with the prior art. This increased tolerance can be used to advantage either by making the holes in the mask larger, thus increasing the size of the beam-spots and, consequently, increasing the light output of the screen, or by decreasing the number of rejects and thus reducing manufacturing costs, or both.

From the foregoing it should now be apparent that the present invention provides a novel structure, method and means for minimizing picture defects resulting from a combination of "radial" and "degrouping" types of mis-register-errors in cathode-ray tubes of the shadow-mask variety.

What is claimed is:

1. Apparatus for plotting upon a photographic plate a pattern corresponding to the mosaic color-phosphor pattern to be applied to the screen of a multi-beam, multi-color kinescope of the kind wherein the several electron-beams in their transit from separate sources each offset from the longitudinal axis of the kinescope to a screen-unit of the shadow-mask variety are subjected to (i) horizontal and vertical scanning forces and also to (ii) dynamic covergence forces, all of said forces operating jointly to shift the color-centers of said electron-beams in both axial and off-axis directions with respect to said longitudinal axis, said apparatus comprising: a support for holding said photographic plate and the mask of said screen-unit in the same relative position that the mask and screen are to occupy in said kinescope, a source of light, means for projecting light rays from said source toward said mask and photographic plate from a point corresponding to the position of the color center of one of said electron-beams at a given agle of deflection, and an aspheric asymmetric lens mounted in the path of said light rays in the space between said point and said mask, said lens having optical properties such that light rays incident thereon at a given angle appear, after leaving the lens, to have originated at a point corresponding to the off-axis position of said selected electron-beam when said electron-beam is subjected to said dynamic convergence forces and is directed by said scanning forces to a path having a deflection angle corresponding to said given angle.

2. The invention as set forth in claim 1 and wherein said aspheric asymmetric lens has the formula:

$$\delta = f_1(h) + f_2(h) \cos \theta$$

wherein: $\delta$ is the depth of the lens at any azimuthal angle $\theta$ and any radius $h$, and $f_1(h)$ and $f_2(h)$ are arbitrary analytic functions of $h$.

3. Apparatus for plotting upon a photographic plate a pattern corresponding to the mosaic color-phosphor pattern to be applied to the screen of a multi-beam, multi-color kinescope of the kind wherein the several electron-beams in their transit from a source offset from the longitudinal axis of the kinescope to a screen-unit of the shadow-mask variety are subjected to (i) horizontal and vertical scanning forces and also to (ii) dynamic convergence forces, all of said forces operating jointly to shift the color-centers of said electron-beams in both axial and off-axis directions with respect to said longitudinal axis, said apparatus comprising: a support for holding said photographic plate and the mask of said screen-unit in the same relative position that the mask and screen are to occupy in said kinescope, a source of light, means for projecting light rays from said source toward said mask and photographic plate from a point corresponding to the position of the color center of one of said electron-beams at a given angle of deflection, and an aspheric asymmetric lens in the path of said light rays in the space between said point and said mask, said lens having a single line of symmetry disposed parallel to a line drawn through said point at right angles to the longitudinal axis of said kinescope.

4. The invention as set forth in claim 3 and wherein said aspheric asymmetric lens has the formula:

$$\delta_0 = f_1(h) + f_2(h)$$

wherein: $\delta_0$ is the depth of the lens measured along said line of symmetry from the center of the lens for any radius $h$, $f_1(h)$ is an even function of $h$ and $f_2(h)$ is an odd function of $h$.

5. The invention as set forth in claim 3 and wherein the variation of the thickness ($t$) with the radius ($h$) of said lens along its said line of symmetry (0) is given by the formula:

$$\left(\frac{dt}{dh}\right)_0 = \frac{\sin u_3 - \sin u_1}{N \cos u_2 - \cos u_3}$$

wherein $u_1$ is the inclination of a particular light ray with respect to the light-axis of said apparatus before incidence upon said lens;

$u_2$ is the inclination of the same light ray within said lens;

$u_3$ is the inclination of the same light ray between said lens and said mask and $N$ is the index of refraction of the lens material at the wavelength of said light ray.

6. The invention as set forth in claim 5 and wherein the following relations obtain between the quantities involved in said formula and ($a$) the distance $Z_L$ between the point from which the light is projected and the lens ($b$) the forward movement $\Delta P$ of said color centers and ($c$) the outward movement $\Delta S$ of said color centers:

$$\tan u_3 = \frac{h - \Delta S}{Z_L + t - \Delta P}$$

$$\sin u_1 = N \sin u_2$$

$$h = Z_L \tan u_1 + t \tan u_2 = (Z_L + t - \Delta P) \tan u_3 + \Delta S$$

References Cited in the file of this patent

UNITED STATES PATENTS

| | | |
|---|---|---|
| 2,174,003 | Ives | Sept. 26, 1939 |
| 2,414,938 | Ernst | Jan. 28, 1947 |
| 2,664,027 | Raitiere | Dec. 29, 1953 |
| 2,690,518 | Fyler et al. | Sept. 28, 1954 |
| 2,703,456 | Smyth | Mar. 8, 1955 |
| 2,745,978 | Van Ormer | May 15, 1956 |
| 2,817,276 | Epstein et al. | Dec. 24, 1957 |

UNITED STATES PATENT OFFICE
CERTIFICATE OF CORRECTION

Patent No. 2,885,935                                            May 12, 1959

David W. Epstein et al.

It is hereby certified that error appears in the above numbered patent requiring correction and that the said Letters Patent should read as corrected below.

Column 4, lines 30 and 31, for "phophor" read -- phosphor --; line 57, for "at a" read -- as a --; line 68, for "3-gum" read -- 3-gun --; column 10, line 28, for "agle" read -- angle --.

Signed and sealed this 13th day of October 1959.

(SEAL)

Attest:

KARL H. AXLINE                                                                    ROBERT C. WATSON
Attesting Officer                                                         Commissioner of Patents